April 5, 1966        P. M. FIELD        3,244,069
PROJECTOR WITH MOVABLE LIGHT SOURCE
Filed May 12, 1964        2 Sheets-Sheet 1
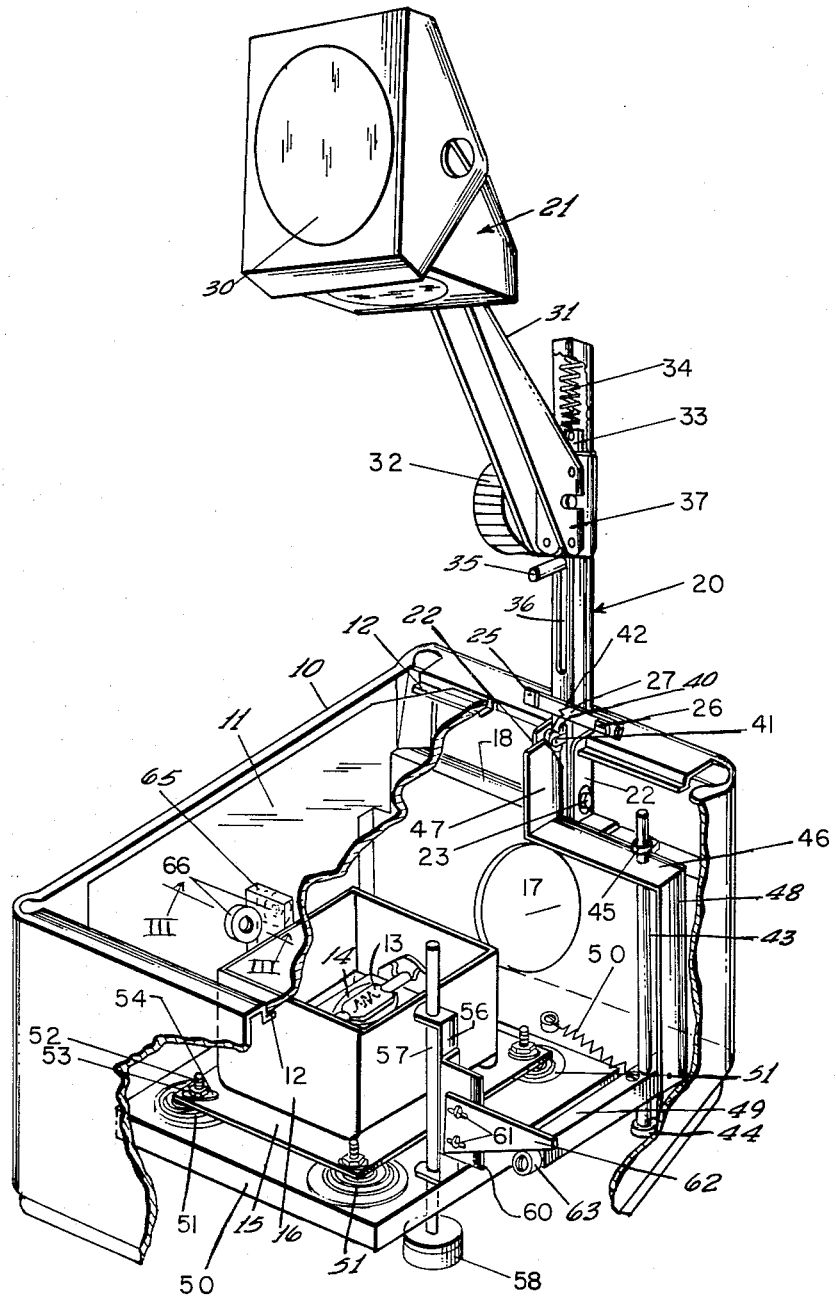
FIG.-1-
INVENTOR.
PHILIP M. FIELD
BY Rudolph J. Jurick
ATTORNEY April 5, 1966  P. M. FIELD  3,244,069
PROJECTOR WITH MOVABLE LIGHT SOURCE
Filed May 12, 1964  2 Sheets-Sheet 2
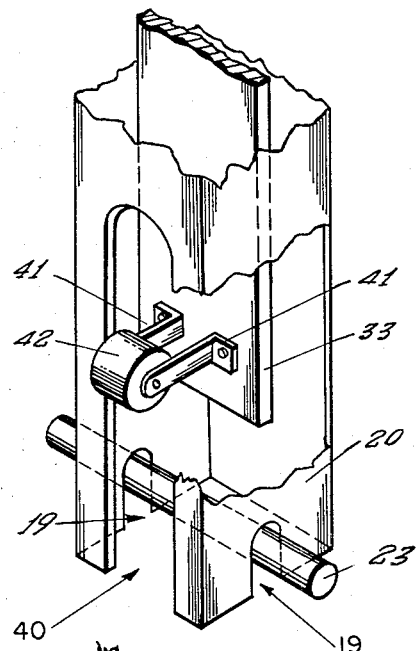
FIG.-2-
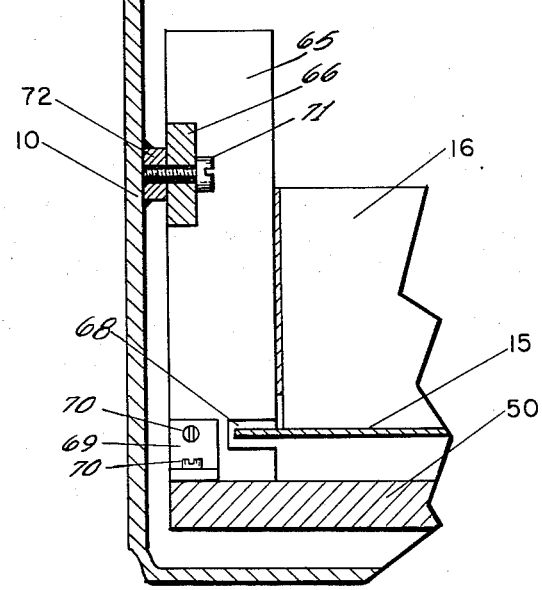
FIG.-3-
INVENTOR.
PHILIP M. FIELD
BY
Rudolph J. Jurick
ATTORNEY United States Patent Office 3,244,069
Patented Apr. 5, 1966

3,244,069
PROJECTOR WITH MOVABLE LIGHT SOURCE
Philip M. Field, Maplewood, N.J., assignor to Charles
Beseler Company, East Orange, N.J., a partnership
Filed May 12, 1964, Ser. No. 366,706
8 Claims. (Cl. 88—24)

This invention relates to photographic projectors and more particularly to an improved construction and arrangement of co-acting components, thereby resulting in a projector of improved optical performance and versatility.

As is well known, the projection lens of a photographic projector must stand at a certain distance from the film or other material being projected in order to produce a sharp image on a screen. Generally, the lens position is determined by the relationship, $$D = F + \frac{F}{M}$$

where,

D is the distance between the film and the rear principal point of the lens,
F is the focal length of the lens, and
M is the magnification of the image on the screen.

Since the magnification is related to the projection distance, and approximately proportional thereto, it can be seen that, for different projection distances, the lens must stand at different positions relative to the film and the second term in the above equation is a measurement of the required lens movement.

Furthermore, the condensing lens of a projector must cover the film, or slide, being projected, and produce an image of the lamp filament in the projecting lens. For maximum efficiency and optimum performance, this image should be as large as possible.

For a fixed condensing system and lamp position, the image of the lamp filament is in a fixed position and any movement of the projecting lens required to obtain a sharp focus for varying projection distances necessarily causes a departure of the projection lens from its optimum position with respect to the condensing system. This is not too critical in a projector involving small film, or slides, or in a projector operating at relatively high magnifications. However, a class of projectors known as overhead projectors, are finding increasing use and these involve a different set of projection conditions.

Overhead projectors are designed primarily for use by a teacher, or lecturer, at the front of a room and they are arranged to project a picture over his head onto a screen disposed at the front of the room, thereby permitting the teacher, or lecturer, to face the class or audience while the latter faces the screen. Overhead projectors involve, (a) Relatively large projection areas, or stages, usually 10 x 10 inches,
(b) Relatively short focal length projection lenses, in the range of 12 to 14 inches, and
(c) Relatively low magnifications, because of the short projection distance, between the projector and the front of the room, and because of the small size of the screen available in most classrooms.

Because of the large projection stage and the short focal length of the projection lens, the angle subtended by the projection stage, at the lens, is relatively large. In consequence, any movement of the projection lens, for purposes of focusing the screen image, is made either at the expense of not filling the lens with the image of the lamp filament, or suffering an aperturing effect as the lens is moved up or down the angular cone of light from the condensing system.

An object of this invention is the provision of an arrangement of parts for overcoming the above-stated shortcomings of photographic projectors.

An object of this invention is the provision of a projector in which the position of the lamp is automatically altered so as always to maintain the filament image in optimum position relative to a movable focusing lens system.

An object of this invention is the provision of a projector wherein the focusing mechanism is mechanically coupled to the projection lamp, thereby to automatically alter the lamp position in correspondence with adjustments of the focusing mechanism.

An object of this invention is the provision of an overhead projector having a mechanical cooperation between the projection lens and the filament of the lamp, and wherein the projection lens is removable from its supporting post.

These and other objects and advantages of the invention will become apparent from the following description when taken in conjunction with the accompanying drawings. It will be understood, however, that the drawings are for purposes of illustration and are not to be construed as defining the scope or limits of the invention, reference being had for the latter purpose to the claims appended hereto.

FIGURE 1 is an isometric view, with parts broken away, of an overhead projector made in accordance with this invention;

FIGURE 2 is an enlarged, fragmentary isometric view showing the lower portion of the post which carries the projection head; and FIGURE 3 is a fragmentary, cross-sectional view taken along the line III—III of FIGURE 1.

Referring to FIGURE 1, the body of the projector comprises a generally rectangular case 10 having an opening formed in the top. Such opening is closed by a transparent plate 11 forming a horizontal projection stage, said plate being supported by the inwardly-directed ledges 12 and secured in fixed position relative to the case by suitable means, not shown. The projection lamp 13 and a suitable reflector 14 are carried on a platform 15 and are disposed within an open-top housing 16. As shown, the sides of the housing 16 are spaced from the platform 15 to provide air intake openings. Normally, a fan, not shown, is mounted in the case 10 and arranged to blow air out of the opening 17, said opening being formed in the vertically-disposed plate 18 and the rear wall of the case, said plate 18 being secured in fixed position within the case 10.

A removable post 20, which post extends through a rectangular opening formed in the top wall of the case 10, carries the projection head 21. Secured to the upper surface of the plate 18 are a pair of spaced brackets 22, having aligned holes formed therein for receiving the rod 23, which rod is secured in place by conventional snap rings. The post 20 is a hollow, rectangular member having aligned, longitudinally-extending tapered slots formed in opposed side walls. These slots extend upwardly from the bottom end of the post and snugly accommodate the rod 23, as specifically shown in FIGURE 2 wherein these slots are identified by the numerals 19. Thus, the post is placed into operative position by inserting the lower end thereof through the rectangular opening formed in the top wall of the case and along the brackets 22 (FIGURE 1) until the notched end of the post rests upon the rod 23. In such position of the post, the rod 23 will be disposed in the aligned slots of the post whereby the lower end of the post is restrained against longitudinal movement, that is, in the direction of the light beam emerging from the projection head 21. Extending upwardly from the case are a pair of tabs 25 and 26, the tab 25 having a latching bar 27 pivotally secured thereto. When the latching bar is in the illustrated position, it presses the post 20 against the rear wall defining the slot in the top of the case and thus restrains the post against rotation about the rod 23. Consequently, the post, although removable, is securely held in the upright operative position.

Although not shown in the drawings, a Fresnel lens is positioned directly beneath the projection stage 11, thereby providing a beam of light which passes through the projection stage and converges upon a tilted mirror disposed within the projection head 21. The light reflected by the mirror passes through the projection lens 30, as a diverging beam, and impinges upon a vertically-disposed screen.

The projection head 21 is carried by an arm 31, which arm includes a sleeve member 37 and is adjustable upwardly and downwardly along the vertical post 20 upon rotation of the knob 32, thereby to focus the image projected on the screen. The mechanism associated with the knob 32 and the post 20, for retaining the projection head in the adjusted position, forms no part of the present invention and may be considered as of conventional construction. In accordance with this invention, there is positioned, within the hollow post 20, a sliding bar 33 which extends to a point below the top surface of the case 10. A tension spring 34, having one end fastened to the sliding bar 33 and the other end secured to the post 20, normally urges the bar upwardly to a predetermined position. A pin 35 is rigidly secured to the slide bar 33 and extends through a longitudinal slot 36 formed in the forward wall of the post 20. The spring 34 maintains the pin 35 in engagement with the lower edge of the rectangular sleeve member 37 throughout the entire range of vertical movement of the projection head 21. It will now be clear that rotation of the knob 32, to effect a lowering of the projection head, results in a corresponding downward displacement of the sliding bar 33.

Another longitudinal slot 40 is formed in the forward wall of the post 20, at the bottom end thereof. This slot forms a guideway for a pair of protruding brackets which are secured to the sliding bar 33 and carry a roller 42, only the one bracket 41 being visible in FIGURE 1. The described arrangement is shown in greater detail in the enlarged fragmentary view of FIGURE 2. Reverting back to FIGURE 1, the slot 40, brackets 41 and the roller 42 are disposed below the top surface of the case 10.

Located within the projector case is a crank assembly which pivots about a fixed, vertical rod 43, said rod being retained in position by a suitable bushing 44, secured to the bottom of the case 10, and an upper bushing 45 carried by the vertical plate 18. The crank assembly comprises a flat, horizontal bar 46, having an upturned end 47 (which end is provided with an inclined surface presented to the roller 42), and a downturned end 48 secured to a horizontally-disposed arm 49. A tension spring 50, secured between the arm 49 and the bottom of the case 10, biases the crank assembly in a clockwise direction about the vertical rod 43, thereby maintaining the inclined surface of the upright portion, or cam, 47 in engagement with the roller 42 at all times.

The lamp 13 can be considered as standing below the geometrical center of the projection stage 11, with the lamp platform 15 resiliently supported on a relatively heavy base 50 by four spring mounts 51. Each spring mount includes a screw 52 passing through holes provided in the base 50 and through clearance holes provided in the platform 15. Thus, the initial lamp position is adjustable, relative to the base 50, by adjustment of the individual nuts 53 having individual washers 54 associated therewith.

A U-shaped bracket 56 is rigidly secured to the base 50 and is provided with aligned holes for slidingly receiving a vertical rod 57, said rod passing through a clearance hole formed in the base 50, and having its lower end rigidly secured to the bottom of the case 10. An L-shaped bracket 60 is secured to the bracket 56, as by welding, and extends laterally therefrom. Such bracket 60 is provided with threaded holes for receiving a pair of fastening screws 61 passing through slots formed in the generally triangular-shaped member 62. The member 62 has an inclined, lower side resting upon a roller 63, which is rotatably carried by the arm 49. It is here pointed out that the spring 50 is sufficiently powerful to cause the roller 63 to lift the entire base 50. Rotation of the crank mechanism, about the vertical rod 43, causes the entire lamp-supporting structure to move up or down in correspondence with angular displacement of the roller 63. The movement of the lamp structure must be restricted to a vertical plane in order to maintain the lamp on the optical axis of the projector. Such restricted, linear movement may be effected by any suitable means. One such means, as shown in FIGURE 1, comprises a guide rail 65 which is secured to the base 50 and which operates between a set of spaced rollers 66, said rollers being rotatably secured to the side of the case 10.

The guide rail and roller arrangement is shown in FIGURE 3, which is a fragmentary, cross-sectional view taken along the line III—III of FIGURE 1. The guide rail is provided with a slot 68, to clear the side edge of the platform 15, and is secured to the base 50 by means of an L-shaped bracket 69 and the screws 70. The rotatable roller 66 is secured in position by the screw 71 threaded into a boss 72 which is welded to the side wall of the case 10. It will be apparent that the described construction results in an arrangement wherein the lamp-supporting structure is movable vertically while being restrained against angular movement.

Normally, the lamp stands at its highest possible position, being held in such position by the roller 63 and cam 62 under the force supplied by the spring 50. Simultaneously, the pin 35 is in its highest position being biased to such position by the spring 34. This corresponds to the shortest projection distance which requires that the projection lens stand at its furthest possible position from the projection stage 11. The projector is so adjusted, at the factory, that with the projection lens focused at the shortest designed projection distance, the pin 35 positively engages the bottom of the bracket 37. As the lens is focused for greater projection distances, the head 21 is moved down the post 20. This causes the roller 42 to move downwardly, thereby rotating the crank mechanism in a counterclockwise direction about the vertical rod 43. This results in an outward movement of the roller 63, thereby enabling the lamp-supporting structure to move downwardly, as required, so that the condensing system images the lamp filament at the new position of the projection lens carried by the head 21. The weight of the lamp-supporting structure is ample to effect a positive lowering of the lamp. It will be obvious, however, that the base 50 can be biased toward the bottom of the case by suitable springs.

The slope of the cam 47 and the relative lengths of the arms 46 and 49, of the crank mechanism, are selected according to optical formulae so that a proper amount of lamp movement is obtained for the particular projection lens being used. In addition, the cam 62 is adjustable on the supporting bracket 60 so that the amount of lamp movement obtained can be correlated precisely as required with the vertical travel of the projection lens. The latter adjustment also provides accommodation for manufacturing variations in the focal length of the projection lens and other mechanical variations in co-acting components.

It will be noted that the action of the roller 42, on the cam 47, does not involve a permanent attachment of the post 20 to the projector housing, which permits the post to be a removable member for easier portability and shipping of the complete device. The post is removed by swinging the latching bar 27 in a counterclockwise direction and pulling the post upwardly and free of the nest formed by the vertical plates 22, and the transverse rod 23.

Having now described the invention, those skilled in this art will be able to make various changes and modifications without thereby departing from the scope and spirit of the invention as recited in the following claims.

I claim:
1. An overhead projector comprising,
   (a) a case having a horizontal projection stage,
   (b) a lamp disposed within the case and carried by a movable support,
   (c) a removable post,
   (d) means for securing the post in upright position on the case,
   (e) a projection head having a focusing lens and carried by the post,
   (f) means for positionally adjusting said head along the post,
   (g) a first operating member carried by said post and movable longitudinally of the post in correspondence with the positional adjustment of the head along the post,
   (h) a second operating member disposed within the case and mechanically-coupled to the said movable support, and
   (i) cooperating coupling elements carried by the two operating members, which elements are automatically coupled together when the post is secured to the case, thereby to effect movement of the said movable support in correspondence with the movement of said projection head along the post.

2. An overhead projector comprising,
   (a) a case having a horizontal projection stage,
   (b) a lamp disposed in the case and carried by a support,
   (c) means mounting said support for vertical movement within the case,
   (d) a vertical post extending from said case,
   (e) a projection head carried by an arm, which arm is slidably supported by said post,
   (f) means for adjusting the said arm along the post to set the projection head at a predetermined position above the projection stage,
   (g) a rotatable crank mechanism disposed within the case,
   (h) means rotating the crank mechanism upon movement of said arm along the post, and
   (i) means imparting vertical movement to the said support upon rotation of said crank mechanism.

3. The invention as recited in claim 2, wherein the said means rotating the crank mechanism comprises a roller carried by the post; means mounting the roller for vertical movement in correspondence with vertical movement of said arm along the post; a cam member secured to the crank mechanism and having an inclined surface presented to said roller; and spring means biasing the crank mechanism to retain said inclined surface in engagemet with the said roller.

4. The invention as recited in claim 3, wherein the said post is hollow and provided with a longitudinal slot formed in the wall; a sliding bar disposed within the post; a pin secured to said sliding bar and extending through the said slot; a bracket secured to said sliding bar and carrying the said roller; and spring means biasing said sliding bar into engagement with the said arm.

5. The invention as recited in claim 2, wherein the said means imparting vertical movement to the said support comprises a roller rotatably carried by the crank mechanism, a cam member secured to the said movable support, said cam member having an inclined surface overlying and engaging the peripheral surface of said roller.

6. The invention as recited in claim 5, wherein the said cam member is adjustable relative to the said support, and wherein the said post is removably secured to the said case.

7. An overhead projector comprising,
   (a) a case having a horizontal projection stage,
   (b) a lamp within said case and carried by a lamp support,
   (c) means mounting said lamp support for vertical movement within the case,
   (d) a hollow post removably secured to the case and extending vertically therefrom,
   (e) a projection head carried by an arm, which arm is slidably carried by the post,
   (f) means forming a longitudinal slot in the wall of said post,
   (g) a sliding bar disposed within said post and extending below the top wall of said case,
   (h) a pin secured to said sliding bar and extending through the said slot,
   (i) spring means urging the sliding bar upwardly so that said pin engages the said arm,
   (j) a first roller carried by said sliding bar and extending into the case,
   (k) a rotatable crank mechanism disposed within said case and having an inclined surface presented to the peripheral surface of the first roller,
   (l) spring means biasing the crank mechanism in a direction to maintain the said inclined surface in engagement with the roller, and
   (m) cooperating means carried by the crank mechanism and said lamp support to effect vertical displacement of the lamp support upon rotation of the crank mechanism.

8. The invention as recited in claim 7, wherein said cooperating means comprises a second roller rotatably carried by the crank mechanism; and a cam member secured to the lamp support, said cam member having an inclined surface resting on the peripheral surface of said second roller.

References Cited by the Examiner
UNITED STATES PATENTS

| | | | |
|---|---|---|---|
| 2,203,658 | 6/1940 | Schubert | 88—24 |
| 2,204,709 | 6/1940 | Straubel et al. | 88—24 |
| 2,860,543 | 11/1958 | Miles | 88—24 X |

NORTON ANSHER, *Primary Examiner.*
EVON C. BLUNK, *Examiner.*
V. A. SMITH, *Assistant Examiner.*